Figure 1:
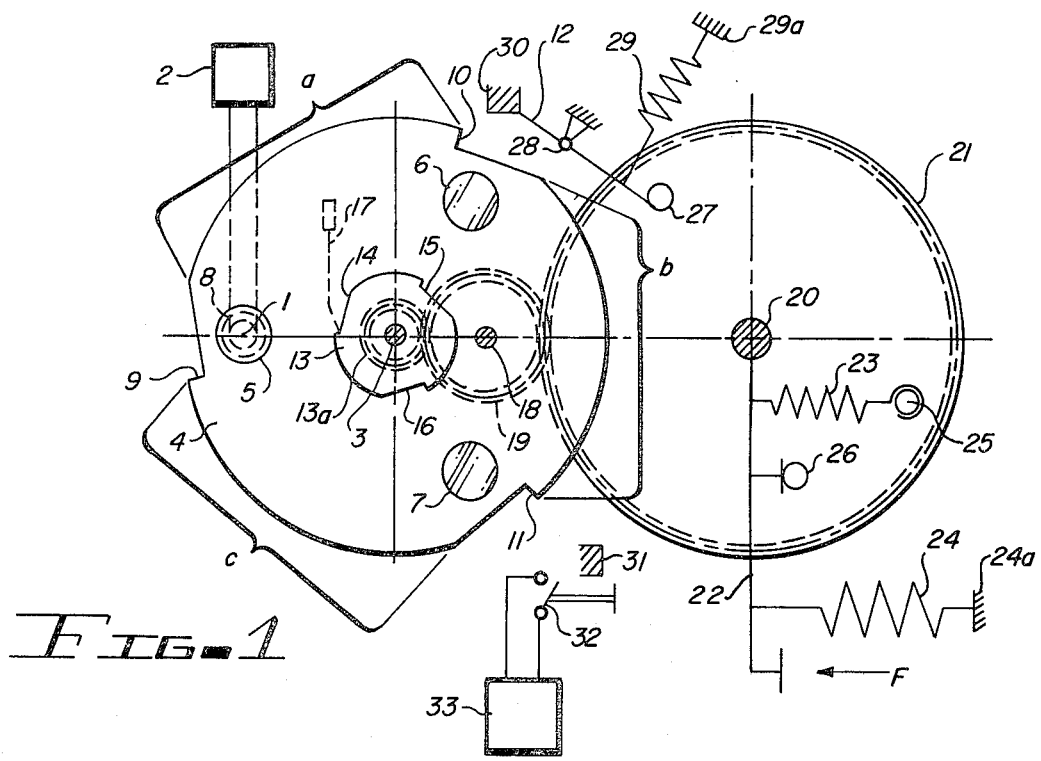

United States Patent [19]

Obertegger

[11] 4,320,976
[45] Mar. 23, 1982

[54] LIGHT MEASURING APPARATUS INCORPORATING MEANS FOR SHIELDING LIGHT SENSOR FOR PREDETERMINED MINIMUM TIME

[75] Inventor: Franz Obertegger, Brixen, Italy

[73] Assignee: Durst AG Fabrik Fototechnischer Apparate, Bozen, Italy

[21] Appl. No.: 102,176

[22] Filed: Dec. 10, 1979

[30] Foreign Application Priority Data

Dec. 1, 1978 [IT] Italy .................................. 4879 A/78

[51] Int. Cl.³ .............................................. G01J 3/50
[52] U.S. Cl. .................................... 356/418; 355/38; 356/404
[58] Field of Search ............... 356/404, 418, 225, 226; 250/232, 233; 355/38

[56] References Cited

U.S. PATENT DOCUMENTS 3,067,649 11/1962 Szymczak ..................... 356/404 X
3,892,493 7/1975 Pallingen et al. .................. 356/226
3,984,185 10/1976 Vinatzer ......................... 356/404 X

*Primary Examiner*—F. L. Evans
*Attorney, Agent, or Firm*—Cahill, Sutton & Thomas

[57] ABSTRACT

A light measuring apparatus for measuring the light transmitted through filters to a light sensor is equipped with a filter wheel having non light transmissive segments alternating with the light transmissive filters, which filter wheel is manually rotatable by a lever. By repositioning the lever through a certain angle, its motion is translated via a spring and various gears and additional transmission elements to rotate the filter wheel and periodically shield the light sensor. The shielding of the light sensor for short periods permits a determination of an error signal in the light measuring apparatus. To obtain a shielding time period above a required minimum independent of the speed with which the lever is moved, the motion of the filter wheel is automatically delayed by mechanical means.

12 Claims, 2 Drawing Figures

LIGHT MEASURING APPARATUS INCORPORATING MEANS FOR SHIELDING LIGHT SENSOR FOR PREDETERMINED MINIMUM TIME

The present invention relates to a light measuring apparatus, and, more particularly, to apparatus for shielding the light sensor of the light measuring apparatus which permits a periodic determination of the magnitude of any error signals.

U.S. Pat. Nos. 3,892,493 and 3,984,185 disclose light measuring apparatus having a switching mechanism for correcting measuring errors, where the measuring technique involves two steps. In the first step, a light sensor, used for the measurement of light, is protected from the impending light by a light shielding system; this first signal generated by the light sensor is stored. In the second step, the light sensor is exposed to the light to be measured and a second signal is generated. The first signal stored from the first step is subtracted from the second signal and the resulting signal is largely free of measuring errors. The light shielding system includes shutters which periodically interrupt the light beam of the light to be measured and directed to the light sensor in response to operation of an electric motor. A well known apparatus, which uses the above described measuring technique, provides a shutter interruption frequency of about 1 Hz. The light shielding has a time duration of about 0.4 seconds, during which time the first signal can be stored.

If such a light measuring apparatus is to be battery powered to increase its portability, a major requirement imposed is that the power consumption be as small as possible. Because the electric motor driving the shutters in the prior art device requires a very high amount of power compared to the power requirement of the measuring circuit, the shutter may be manually operated to reduce significantly the power requirements. With manual operation of the light shielding mechanism, care must be taken to insure that the light shielding step not to be shorter than a certain minimum time period and be compatible with the time constants of the light measuring circuit. For a given circuit design discussed in the above referenced U.S. Letters Patent, the minimum acceptable time during which the light sensor must be shielded is about 150 milliseconds. If the time is shorter than this limit, then measuring errors cannot be fully corrected, which results in a decreased accuracy of the light measuring apparatus.

It is therefore a primary object of the present invention to provide, in a light measuring apparatus, a manually operated light shielding mechanism for shielding the light sensor a minimum time period independent of the speed of manipulation of the mechanism by an operator.

A special benefit of the present invention exists if the shielding apparatus is used with a light measuring system for the determination of the color components of the light for photographic color copying processes, where two or more optical filters are sequentially introduced into the light beam of the light measuring apparatus. If these filters are arranged upon a filter carrier, for example a filter wheel, at a certain distance from each other, the space between the filters can be used for shielding purposes. Herein, the necessary step of moving the filter wheel from one filter position to the next can be combined with the shielding step to develop the error signal.

Another object of the present invention is to provide a filter wheel having interleaved filters and non light transmissive segments to shield a light sensor and develop an error signal each time the filter wheel is rotated.

These and other objects of the present invention will become apparent to those skilled in the art as the description thereof proceeds.

Figure 2:
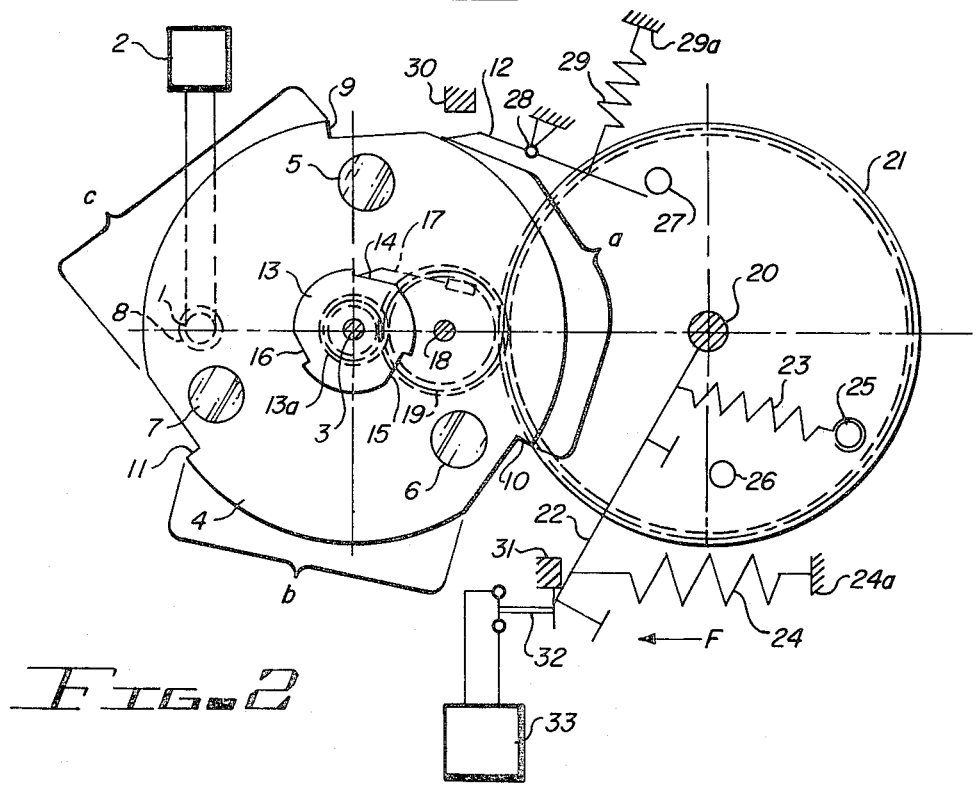

The present invention will be described with greater specificity and clarity with reference to the following drawings, in which:

FIG. 1 is a schematic illustration of a light measuring apparatus in a first state for intermittently shielding a light sensor and determining the three basic color components of a light for a photographic color copying system; and FIG. 2 is a schematic illustration of the light measuring apparatus in a second state.

Referring to FIG. 1, a light sensor, such as a photodiode 1 is connected to a circuit 2, which circuit may be of the type described in U.S. Pat. Nos. 3,892,493 and 3,984,185. In circuit 2, the error signal and the output of photodiode 1 are processed and the resultant signal is displayed. In order to be able to process signals of very low intensity with sufficient accuracy, the signal processing is divided into two steps.

In the first step, photo diode 1 is shielded from the light source and the photodiode generates an error signal which is stored in circuit 2. Since this signal is obtained with photo diode 1 shielded, ideally no signal should be obtained; however, a signal is generated which is a pure error signal and mainly dependent upon temperature and age-sensitive changes of the offset voltage of the amplifier used for the amplification of the signals in circuit 2.

In the second step, photo diode 1 is exposed to the light to be measured and will generate an output signal. In circuit 2, the error signal is subtracted from the output signal and the resultant signal is largely error free.

A filter wheel 4, rotatable about axis 3, is mounted in cooperative relationship to photo diode 1. Three color filters 5, 6, 7, each of which transmit only light of a certain basic color are equiangularly arranged in the filter wheel. For example, filter 5 is a blue filter, filter 6 is a red filter, and filter 7 is a green filter. Areas (a), (b), (c) between the three color filters of filter wheel 4 are opaque to light (non light transmissive) and can therefore shield photodiode 1 from the impinging light when the filter wheel is positioned in the corresponding rotary position. The light to be measured is limited by an entrance diaphragm 8 which is supported by a case (not shown) for housing the apparatus illustrated in the figures. At the circumference of filter wheel 4, three notches 9, 10, 11 are arranged equiangularly about the perimeter of the filter wheel. These notches cooperate with a locking bar 12, which bar will be functionally described below.

A wheel 13 is rotatable about axis 3 independent of filter wheel 4. On the circumference of wheel 13 there are disposed notches 14, 15, 16 which are engageable with a spring-loaded bar 17 connected to filter wheel 4 and bearing upon the perimeter of the wheel. Connected to wheel 13 is a gear 13a, which gear is rotatable about axis 3 and meshes with an intermediate gear 19 rotatable about axis 18. Intermediate gear 19 meshes with gear wheel 21 rotatable about axis 20. A lever 22 is rotatably mounted upon axis 20. The lever serves as a control member and upon which one end of each of springs 23 and 24 act. The other end of spring 23 is attached to lug 25, which lug is solidly connected to gear wheel 21. The other end of spring 24 is connected to the housing for the apparatus at point 24a.

In the first state of the apparatus, as shown in FIG. 1, lever 22 engages stop 26 of gear wheel 21. Gear wheel 21 has a second lug 27, which lug engages with locking bar 12. The locking bar is pressed against stop 30 of the housing for the apparatus to oppose the action of spring 29, which spring has one end connected to locking bar 12 and the other end to point 29a of the housing for the apparatus. Springs 23, 24 and 29 are coil springs. Lever 22 may be manually swung by an operator in a clockwise direction. The maximum excursion of the lever is limited by a stop 31 of the housing for the apparatus. Near this stop, electric switch 32 is located. It includes normally open contacts which are closed by lever 22 on movement of the lever to stop 31, as shown in FIG. 2. The contacts of switch 32 are connected to an indicating circuit 33 (not described in detail) to provide an indication of the functional status of the apparatus.

The function of the apparatus may be described as follows. In the first state, lever 22 is pulled by spring 24 against stop 26 by a counterclockwise acting force. Simultaneously, lug 27 engages locking bar 12 which in turn is pressed against stop 30. Thereby, the position of gear wheel 21 is determined for the first state. In this state, bar 17 rests in one of the notches 14, 15 or 16 of wheel 13. One of color filters 5, 6, 7 is between the photodiode 1 and diaphragm 8.

By manually operating lever 22, it is moved about its axis of rotation 20 to the final position determined by stop 31. Via spring 23, gear wheel 21 is rotated in the same direction and drives, via the intermediate gear wheel 19 and the gear section 13a, wheel 13 in a clockwise direction. Upon incremental rotation of gear wheel 21, the engagement of lug 27 with the locking bar 12 is gradually decreased and the locking bar is drawn by spring 29 against the circumference of filter wheel 4. As soon as the next of notches 9, 10, or 11 approaches locking bar 12 upon further rotation of filter wheel 4, the locking bar tracks the perimeter of the filter wheel and eventually causes rotation of the filter wheel to stop when it reaches a notch. The position of the notches is chosen to position a color filter to interupt the beam of light impinging upon photo diode 1 through light diaphragm 8 every time the filter wheel 4 is brought to a stop. In example, each of notches 9, 10, 11 may be angularly displaced by 120° from one of the color filters 5, 6, 7. The same angular displacement may be applied for notches 14, 15, 16 of wheel 13.

In FIG. 2, a second state or intermediate position of filter wheel 4 is shown, where the locking bar 12 engages a part of its perimeter. The minimum time, which is needed for rotation of the filter wheel by an angle of 120° is determined by the moment of inertia of the filter wheel, the transmission elements engaged with it, the spring force of spring 23 which is generated by the movement of lever 22 and dependent on the corresponding spring constant and the force of friction. These parameters are so proportioned that even with a very fast movement of lever 22 a sufficiently long time is guaranteed for the shielding of photo diode 1. This shielding is accomplished, as mentioned above, by areas (a), (b), (c) of filter wheel 4. The time during which filter wheel 4 rotates through an angle of 120° from one filter position to the next is typically, with fast motion of lever 22 to stop 31, 150 milliseconds (ms) whereby the duration of movement of the lever itself is less than 150 ms.

During the measurement by circuit 2 of the light beam impinging upon photodiode 1 through one of the filters, lever 22 remains in its final position against stop 31. It can be held in this position by a device not illustrated. The contacts of the limit switch 32 are closed in this position of lever 22, whereby display circuit 33 generates a signal indicating the readiness of the measuring system. The signals required for the operation of circuit 2 for the adjustment and the storage of the error signals, as well as the subtraction from the output signal, can be controlled via sliding brushes which are engaged with corresponding conductors of filter wheel 4. These features are not shown and described in detail because they are well known to those skilled in the art.

When lever 22 is released by the operator or its holding device is released, spring 24 returns lever 22 into its starting position whereby gear wheel 21 is caused to rotate via the lever bearing against stop 26. A similar rotational movement is also effected by intermediate gear 19, gear 13a and wheel 13. Filter wheel 4, however, remains in the second state, since bar 17 slides along the circumference of wheel 13 and comes to rest on completion of the return of wheel 13 in the nearest notch in wheel 13. The combination of bar 17 and wheel 13 acts as a free-wheeling device, which transmits motion only in one direction. The position of filter wheel 4 remains essentially unchanged during the return of lever 22 and the corresponding movements of the other elements if the friction force acting upon the filter wheel together with its moment of inertia is higher than the friction force caused by the sliding of bar 17 upon wheel 13.

The delay between the motion of the control element, which is lever 22 as described above, and the filter wheel, can also be achieved by equivalent means. For example, instead of the described filter wheel, a different type might be used with more or fewer filters and with opaque zones near the filter(s) for shielding the light sensor; and, the control element might have a rectilinear of other motion, which would require the transmission or translation elements to be modified. The necessary changes and modifications are within the competence of one skilled in the art and need to be further discussed.

In addition, the delay by equivalent means is also possible if the filter wheel is a separate unit. For example, the filter wheel may consist only of the segment containing area (a) of the described filter wheel.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A light shielding apparatus useable with a light measuring device having a light sensor for sensing the light to be measured, a circuit for generating an error signal upon shielding of the light sensor and for generating an output signal resulting from the light sensed by the light sensor and corrected by the error signal, said apparatus comprising in combination:

(a) shielding means for shielding the light sensor to permit the circuit to generate the error signal;
(b) a control member for manually operating said shielding means; and
(c) regulating means for regulating operation of said shielding means to shield the light sensor for a specified minimum time duration independent of the speed of manual actuation of said control member.

2. The apparatus as set forth in claim 1 wherein said shielding means comprises:
(a) a light transmissive element;
(b) a non light transmissive element; and
(c) means for alternately juxtaposing said light transmissive element and said non light transmissive element with the light sensor to intermittently shield the light sensor.

3. The apparatus as set forth in claim 1 wherein said shielding means comprises a filter wheel housing at least one light transmissive filter; at least one non light transmissive element; and means for rotatably mounting said filter wheel to permit selective juxtapositioning of said light transmissive filter and said non light transmissive element with the light sensor.

4. The apparatus as set forth in claim 3 wherein said control member includes a movable lever and wherein said regulating means includes translating means for translating motion of said lever to rotary motion of said filter wheel.

5. The apparatus as set forth in claim 4 wherein said regulating means includes means for limiting rotation of said filter wheel in one direction.

6. The apparatus as set forth in claim 5 wherein said translating means includes spring means coupled to said lever and responsive to movement of said lever for providing a motive force to rotate said filter wheel, said spring means delaying rotation of said filter wheel relative to movement of said lever for juxtaposing said non-light transmissive element with the light sensor for at least said specified minimum time duration, the delayed rotation of said filter wheel being a function of the movements of inertia of said filter wheel and of said regulating means.

7. The apparatus as set forth in claim 6 wherein said regulating means includes a rotatable gear wheel coupled by said spring means to said lever, a notched wheel mounted on a common axis with said filter wheel and wherein said limiting means includes a bar extending from said filter wheel for engaging one of the notches of said notched wheel to prevent rotation of said filter wheel in one direction and gear means interconnecting said gear wheel with said notched wheel.

8. The apparatus as set forth in claim 7 wherein said regulating means includes a plurality of nothces in said filter wheel and a locking bar for engaging one of the notches of said filter wheel to prevent rotation of said filter wheel in one direction.

9. The apparatus as set forth in claim 8 wherein notches of said filter wheel are disposed in the perimeter of said filter wheel and wherein said locking bar includes further spring means for biasing said locking bar against the perimeter of said filter wheel.

10. The apparatus as set forth in claim 9 wherein said gear wheel includes a lug for disengaging said locking bar with the nothces of said filter wheel upon rotation of said gear wheel in one direction.

11. The apparatus as set forth in claim 10 wherein said filter wheel includes three equiangularly oriented filters located at a common distance from the axis of rotation of said filter wheel and wherein the notches in said filter wheel are equiangularly spaced along the perimeter of said filter wheel in angular relationship to said filters to juxtapose one of said filters with the light sensor on engagement of said locking bar with one of the notches of said filter wheel.

12. The apparatus as set forth in claim 11 wherein the notches in said notched wheel are equiangularly spaced about its perimeter.

* * * * *